2,754,242
Patented July 10, 1956

2,754,242

PROCESS OF COMBATTING INSECTS UTILIZING PHOSPHINATES

Gennady M. Kosolapoff, Auburn, Ala., assignor to Monsanto Chemical Company, St. Louis, Mo., a corporation of Delaware No Drawing. Application March 11, 1953,
Serial No. 341,829

2 Claims. (Cl. 167—30)

This invention relates to insecticidal products.

One object of this invention is to provide an insecticidal product containing an alkyl bis(p-chlorophenyl) phosphinate. This invention, accordingly, provides an insecticidal product having as its active ingredient a compound having the formula:

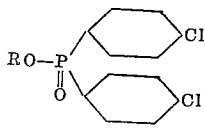

where R is an alkyl group containing between 1 and 4 carbon atoms.

The present phosphinate compound may be prepared by the reaction of chlorobenzene with phosphorus trichloride and the product thereafter chlorinated to the pentavalent state by elemental chlorine in the presence of aluminum chloride, followed by esterification with an alcohol having from 1 to 4 carbon atoms. The product obtained by this reaction is generally a mixture of phosphonate and phosphinate compounds which may be separated by distillation.

The following examples illustrate the preparation of typical compounds of the present invention.

Example 1

One hundred-twelve parts of chlorobenzene, 172 parts of phosphorus trichloride and 44.4 parts of aluminum chloride were heated under reflux for 40 hours. The excess phosphorus trichloride was then removed and the remainder of the reaction mixture diluted with 200 parts of tetrachlorethane and then chlorinated by the direct addition of elemental gaseous chlorine carried out with ice cooling. The chlorine was added to saturation. The reaction mixture was then subjected to a vacuum to remove excess chlorine, after which 333 parts of butanol were used for esterification. Distillation gave the following products:

Dibutyl para-chlorobenzene phosphonate, B. P. 188° at 5 mm., and

Butyl bis-para-chlorobenzene phosphinate, B. P. 227–228° at 5 mm.

Example 2

A mixture of 112.6 g. of chlorobenzene, 549.4 g. of phosphorus trichloride and 200 g. of aluminum chloride were refluxed for 40 hours. After removal of excess phosphorus trichloride in vacuum with stirring, 200 cc. of tetrachloroethane was added and the mixture was chlorinated at ice-bath temperature by the direct addition of elemental gaseous chlorine. After the chlorine had been added to saturation, dry air was pulled through the mixture for 15 minutes to remove excess chlorine, after which 230 g. of absolute alcohol was added under water pump vacuum over a period of 1½ hours with each cooling. After standing overnight the reaction mixture was decomposed by pouring on ice and was then washed twice with water. Distillation gave the following products:

Diethyl para-chlorobenzene phosphonate, B. P. 133–139° at 2 mm., $n_D^{25}$ 1.5069, and Monoethyl bis-para-chlorobenzene phosphinate, B. P. 195–205° at 2.5 mm., $n_D^{25}$ 1.5773.

In a manner similar to the above, other alkyl bis(p-chlorophenyl) phosphinate compounds having from 1–4 carbon atoms in the alkyl group may be prepared.

For the purpose of combating insect pests any of the present alkyl-substituted phosphinate compounds described above may be employed either in the pure form or as a mixture containing the said phosphinate together with the corresponding phosphonate compound. Should it be desirable, the mixture obtained from the reaction given above may be subjected to purification. For example, if it is desired to employ the pure phosphinate compound a vacuum distillation may be employed and the lower boiling phosphonate compound may be separated in this manner from the higher boiling phosphinate compound.

Example 3

A quantity of ethyl bis(p-chlorophenyl) phosphinate as produced by the method of Example 2 is dissolved in cyclohexanone to obtain a series of solutions having concentrations of one part of the mixture to 500 parts of cyclohexanone, and also further diluted to one part of the essential component to 1000 parts and also one part to 2000 parts of cyclohexanone. The said solutions were then applied to bean plants infested with two-spotted mite. It was found that a high degree of killing was obtained for each of the concentrations (1–500, 1–1000, and 1–2000).

The ethyl bis(p-chlorophenyl) phosphinate may be dissolved in organic solvents such as carbon tetrachloride, ethylene dichloride, alcohols, such as ethyl, isopropyl or higher alcohols, esters such as ethyl acetate or an aromatic solvent such benzene, ortho-dichlorobenzene, toluene or xylene. The active component may also be dissolved or emulsified with the usual petroleum solvents conventionally utilized for this purpose. Suitable emulsions may be made by dissolving the active material in cyclohexanone, xylene or other analogous solvent, adding an emulsifying agent and then when the material is to be used adding the cyclohexanone solution of the active material to water in the proper concentration.

The products may also be mixed in various proportions with finely divided carrier solids such as powdered sulfur, talc, bentonite, wood flour, starch, carbon black, etc. and the powder used as an insecticidal dust in the usual manner.

The powdered solutions or emulsions may be applied to insect-infested vegetation by mechanical dusting or by atomizing the liquid solution or emulsification in the customary manner.

When the present active compounds are employed in combination with solvents, dusts or in emulsified form they maintain their initial, high activity over a very high range of dilution. The present products are useful in combating a wide variety of insects. For example, the use of 1–500 concentration in cyclohexanone against Mexican bean beetle larvae showed that the larvae did little feeding of foliage sprayed therewith.

The present alkyl bis(para-chlorophenyl) phosphinate compounds may be used alone or may be combined with other insecticides in various proportions to obtain a combination insecticide having increased activeness against insect pests. The present products may thus be combined with $\alpha,\alpha$-di-(parachlorophenyl)-$\beta,\beta,\beta$-trichlorethane (commonly known as DDT) in various proportions.

When an alkyl bis(para-chlorophenyl) phosphinate is used alone against insecticidal pests upon fruit or vegetable plants it has been found that the spray residue left upon the fruit or vegetables rapidly becomes non-toxic to animal organisms. This effect, while not completely understood, is thought to be the result of the hydrolysis of the ester, which reaction is believed to be induced by the moisture present in the air. As a result, spray residues of the present phosphinates which are several or more days old need generally not be removed by washing, as is the case with many other insecticides.

The active constituent of the present insecticidal composition, for example, the ethyl bis(para-chlorophenyl) phosphinate may be formulated with any insecticide carrier such as a powder, solvent or emulsion. The proportion of the ethyl bis(para-chlorophenyl) phosphinate with respect to the carrier may be varied over a broad range, such as in the concentration of 1/4000 to 1/100.

What is claimed is:

1. The process of combating insect pests which comprises applying to said pests an alkyl bis(para-chlorophenyl) phosphinate wherein the alkyl group contains between 1 and 4 carbon atoms.

2. The process of combating insect pests which comprises applying to said pests ethyl bis(para-chlorophenyl) phosphinate.

References Cited in the file of this patent

UNITED STATES PATENTS 2,615,037　　Moyle _____ Oct. 21, 1952

FOREIGN PATENTS 326,137　　Great Britain _____ Feb. 28, 1930

OTHER REFERENCES

Kosolapoff: Organophosphorous Compounds, John Wiley & Sons, Inc., New York, 1950, pp. 128 to 129.

Coover: Organic Chemical Bulletin, vol. 23, No. 4, 1951, pp. 1–4.

Kosolapoff (2): J. Am. Chem. Soc., vol. 69, August 1947, pp. 2020–2021.